(12) United States Patent
Denton

(10) Patent No.: US 11,043,049 B2
(45) Date of Patent: *Jun. 22, 2021

(54) ACCESS CONTROL SYSTEM BYPASS FOR AUDIT AND ELECTRONIC SAFE LOCKS

(71) Applicant: Scott C. Denton, Rancho Cucamonga, CA (US)

(72) Inventor: Scott C. Denton, Rancho Cucamonga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,316

(22) Filed: Sep. 23, 2019

(65) Prior Publication Data
US 2020/0020185 A1 Jan. 16, 2020

Related U.S. Application Data

(63) Continuation of application No. 15/809,887, filed on Nov. 10, 2017, now Pat. No. 10,424,142.

(60) Provisional application No. 62/420,556, filed on Nov. 10, 2016.

(51) Int. Cl.
G07C 9/00 (2020.01)
G06F 16/25 (2019.01)
G06F 16/955 (2019.01)

(52) U.S. Cl.
CPC ....... G07C 9/00309 (2013.01); G06F 16/258 (2019.01); G06F 16/955 (2019.01); G07C 9/00912 (2013.01); G07C 9/0069 (2013.01); G07C 9/00571 (2013.01); G07C 2009/00412 (2013.01)

(58) Field of Classification Search
CPC ...... G07C 9/00309; G07C 2009/00412; G07C 9/00912; G06F 17/30876; G06F 17/30569
USPC .......................................................... 340/5.6
See application file for complete search history.

(56) References Cited

U.S. PATENT DOCUMENTS

| | | | | |
|---|---|---|---|---|
| 9,811,960 | B2* | 11/2017 | Voss | G07C 9/27 |
| 9,934,636 | B1* | 4/2018 | Burge | G07C 9/00904 |
| 2006/0179057 | A1* | 8/2006 | Moretti | G07C 9/38 |
| 2017/0046896 | A1* | 2/2017 | Schroader | G07C 9/38 |
| 2018/0108196 | A1* | 4/2018 | Abner | G07C 9/00912 |
| 2019/0180533 | A1* | 6/2019 | Gilbertson | G07C 9/00857 |
| 2019/0182669 | A1* | 6/2019 | Conrad | G07C 9/00571 |

* cited by examiner

Primary Examiner — Hirdepal Singh
(74) Attorney, Agent, or Firm — Ivan Posey; Leech Tishman Fuscaldo & Lampl

(57) ABSTRACT

The disclosed system and method allows opening of a safe by either the safe's electronic lock, and/or by any on-site or remote access control systems. The system and method provides a data audit of all safe opening and closing, with user, time and date recordings, allows for exceptions reporting of any safe openings with a keyed bypass, and utilizes a variety of electronic high security safe locks and audit locks. An access control relay powers the safe lock's internal actuator, bypassing the safe lock's logic decoding, allowing the safe to be opened. A diode may prevent feedback to lock's logic circuits.

10 Claims, 4 Drawing Sheets

ACCESS CONTROL SYSTEM BYPASS FOR AUDIT AND ELECTRONIC SAFE LOCKS

CROSS-REFERENCE TO RELATED APPLICATIONS

This application is a continuation of pending U.S. patent application Ser. No. 15/809,887 titled "ACCESS CONTROL SYSTEM BYPASS FOR AUDIT AND ELECTRONIC SAFE LOCKS" and filed on Nov. 10, 2017, which is a continuation of U.S. Provisional Patent Application No. 62/420,556 titled "ACCESS CONTROL SYSTEM BYPASS FOR AUDIT AND ELECTRONIC SAFE LOCKS", filed on Nov. 10, 2016, the contents of which are incorporated herein in their entirety.

FIELD OF THE INVENTION

The present invention relates to an access control system bypass for audit and electronic safe locks. More specifically, the present invention relates to systems and methods that allow opening of a safe by either the safe's electronic lock, or by any on-site or remote access control systems, and provides data audit of all safe opening, closing, with user, time and date.

BACKGROUND OF THE INVENTION

Protecting currency in a commercial setting continues to be a crucial and often daunting task, notwithstanding the great strides made in developing security systems over the last 100 years. Electronic cash management systems have largely taken the place of the traditional steel vault or safe, and point-of-sale cash registers have become much more sophisticated as they have become microprocessor controlled. Yet, all great advances in security equipment have been followed by more elaborate thievery schemes such that the commercial world has needed to continually update and improve.

Many standard business practices and policies have been developed to address the problem of retail theft. For instance, businesses typically do not allow large amounts of cash to accrue at any point-of-sale location. Thus, in a given retail store, there is typically a central safe where excess cash from cash registers is deposited for safe-keeping. Some protection is obtained by restricting the employees' access to such safes. Similarly, armored cars are used to transport the cash from stores to the bank. However, since the accounting itself is done manually, there are glaring gaps in the security system. Another problem with safes is that they may be physically removed and there would be little or no evidence of how much cash was stolen.

In a larger business setting, it may be necessary to have a number of different portals where cash is accepted from customers. Safes have also been developed for cash control that include basic cash management features such as the ability to make change or to scan for counterfeit currency. In addition, it is commonly the case that numerous employees have access to cash depositories throughout the day. Accordingly, it is important that a business be able to manage cash access and control such as to reduce thievery and enable accountability to be enhanced among cash-handling employees. This has led to the development of safes that identify the cash deposits and withdrawals and track them according to an individual employee. The capability to identify and verify the identity of employees is essential to accountability.

In business settings involving multiple cash depository stations, the management and oversight of the total collection of data and cash from the stations can be quite a challenge. Prior art systems have been developed to enable multiple cash depository safes to be integrated together, but such systems are often costly and complicated. In addition, the integration of multiple safes can lead to a compromise of security in that should the code or access to part of the system be compromised by, for example, the resignation of a key employee with access information, the entire system may be vulnerable. In this respect, the process whereby one safe serves as a controlling master safe for the group of networked safes could actually undermine the system when access rights are shared or compromised, or software is hacked. Likewise, when one or more of a collection of networked safes utilizes software that is "resident" on the safe or cash access terminal itself, a risk exists that the entire system could be compromised by a physical break-in to a particular safe to access and de-code the resident software.

However, using the above techniques, and others like them, the safes are still physically and electronically vulnerable. The system and method of the present invention solves these and other problems in the prior art.

SUMMARY OF THE INVENTION

According to one preferred embodiment, the system and method allows opening of a safe by either the safe's electronic lock, and/or by any on-site or remote access control systems. The system and method provides a data audit of all safe opening and closing, with user, time and date recordings, allows for exceptions reporting of any safe openings with a keyed bypass, and utilizes a variety of electronic high security safe locks and audit locks. An access control relay powers the safe lock's internal actuator, bypassing the safe lock's logic decoding, allowing the safe to be opened. A diode may prevent feedback to lock's logic circuits.

The safe's lock may work as normally programmed, with all the safe lock's features, including but not limited to, event audit, single or multi users, biometric readers, keypad, semi-conductor or other smart keys, or mechanical keys. Also, the system and method can control multiple safe doors with all available lock system features.

The safe may be opened with an access control system (ACS), which may be local or remote. The ACS may define user access rights, and reports authorized openings, and attempted access by unauthorized access control system users. An alarm contact reports all safe door open and close times and dates. Comparing the alarm input data of safe door openings to the Access Control system's authorized openings reveals any bypass openings. Integration with a closed circuit television (CCTV) system allows for auditors to identify the keyholder that bypassed the access control system. Furthermore, for safes equipped with an electronic audit lock, there is no need for a bypass key system, instead, the safe door can be opened by either the access control system or by a uniquely issued user code, when opened by the user code, a third audit record is created and stored in the audit lock (in addition to the records in the access control system, and opening record in the alarm system. Redundant audit records are now relied on for successful prosecution and recovery of lost assets, along with improved prevention of internal theft.

Parts of the system may operate on power supplied by the safe's lock system or the access control system, on demand.

DETAIL DESCRIPTION OF THE PREFERRED EMBODIMENTS OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Figure 1:
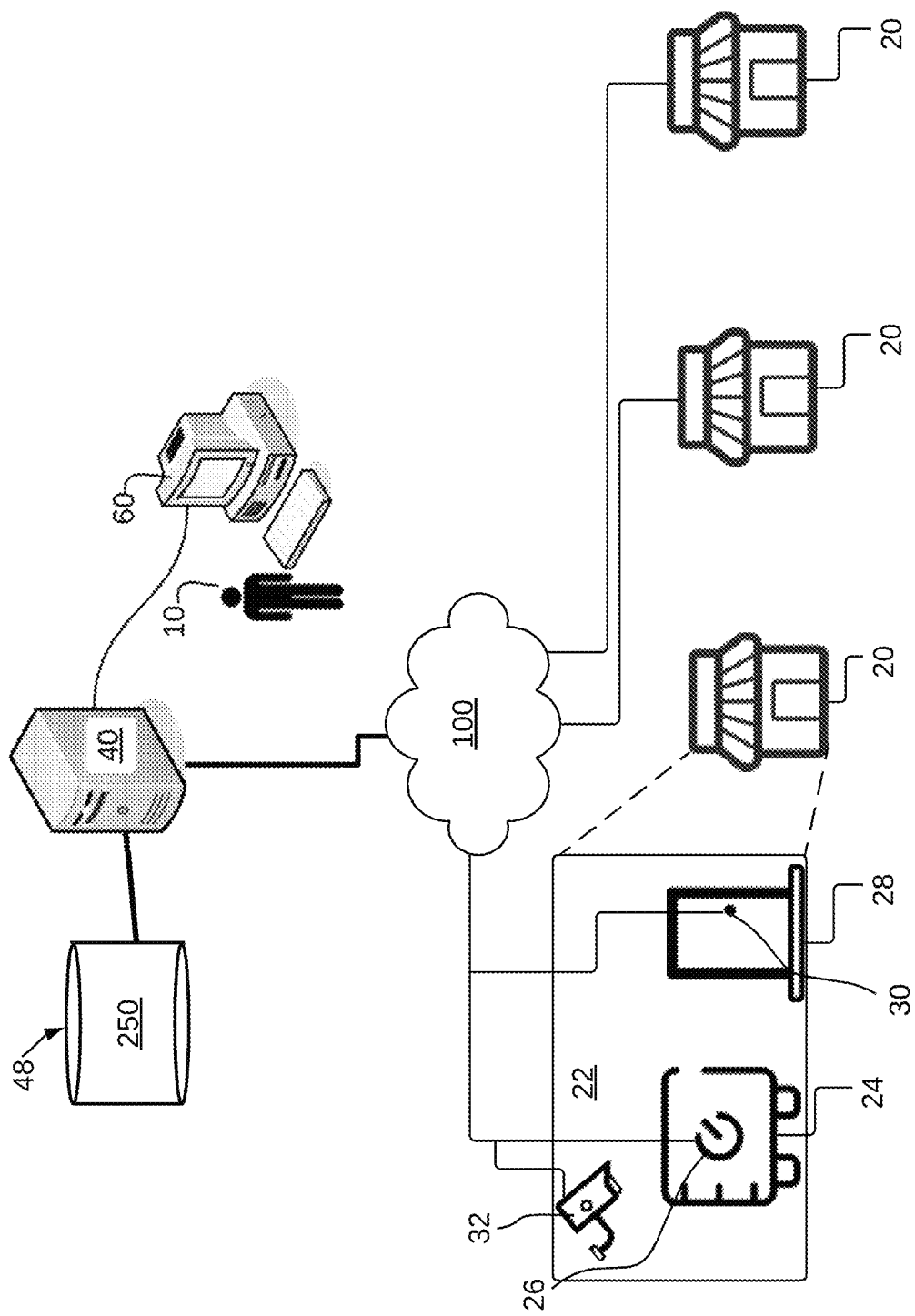
FIG. 1 is a diagramatic overview of a network on which the system and method may operate.

With reference to FIG. 1, a diagramatic overview of a network on which the system and method may operate according to one embodiment is shown. As is typical on today's internet 100, users 10 may connect to and use the internet 100 over several platforms. Those platforms may include personal computers 60, mobile devices such as mobile phones, tablets, or the like. Through any such platforms including but not limited to personal computers 60, mobile devices, tablets, or the link, users may access a server app or software run by the server 40 to control access to safes 24 and doors 28 to rooms 22 containing the safes 24. These safes 24, doors 28, and rooms 22 may be contained within, for example, retail establishments 20 such as stores, banks, restaurants, or the like.

One or more servers 40 may include one or more storage devices 48 containing one or more databases 250. All of these components may be used to control access locks 20 and 30 for the safes 24 and doors 30. Further, a video or still surveillance camera 32 may capture video or images of any access to the room 22 and safe 24 for storage in the database 250 along with access control data.

Figure 2:
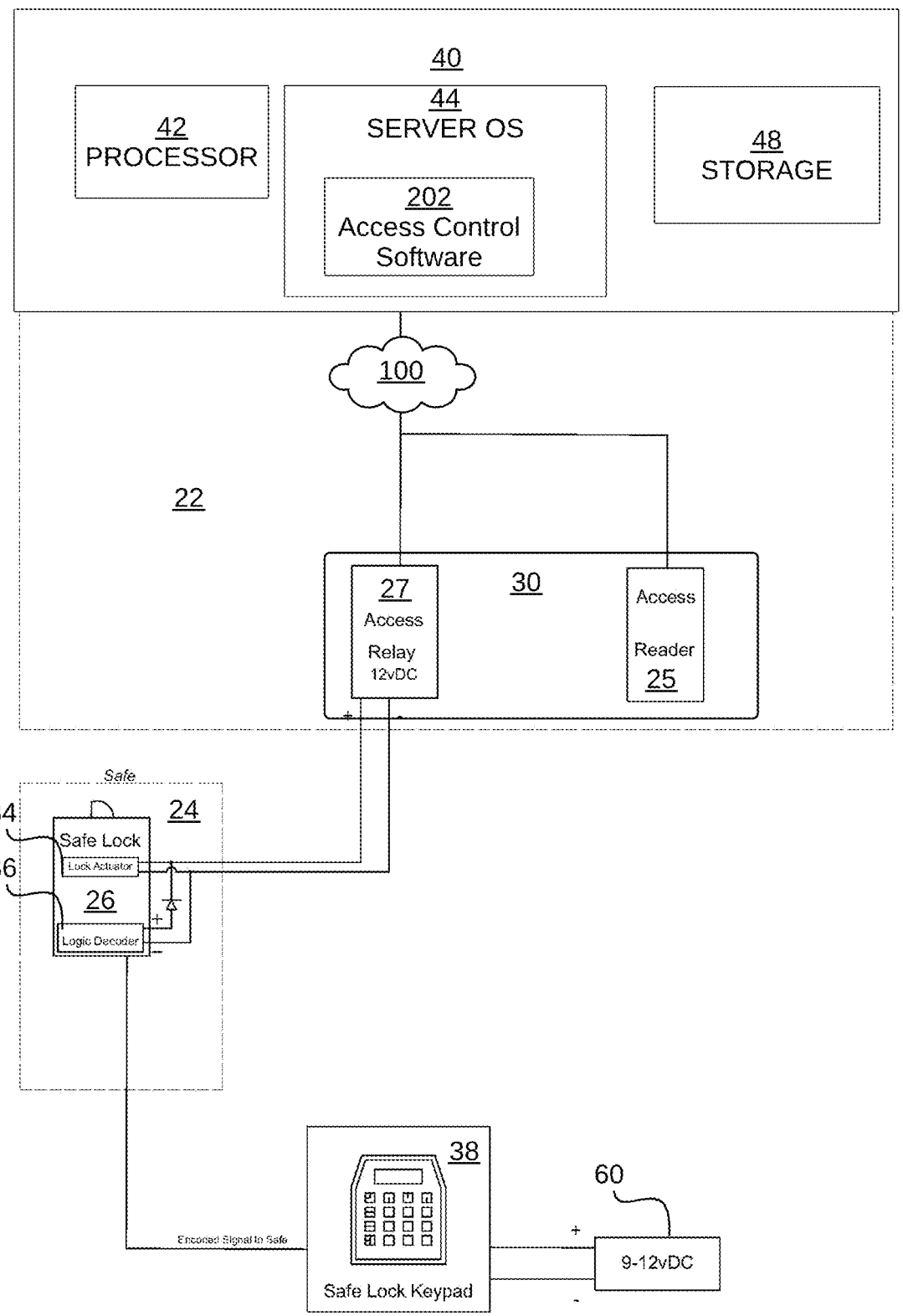
FIG. 2 is a diagrammatic representation of components and data flow of the embodiment of FIG. 1.

With reference to FIG. 2, a diagrammatic representation of components and data flow of the embodiment of FIG. 1 is shown. One or more servers 40 and storage at least one device 48 with a database 250 is shown. As those skilled in the art would recognize, one or more computer programs may be loaded by an operating system 44 running on the server processor 42. One of the computer programs may comprise access control software 202 allowing users 10 to control access to the rooms 22 and the safes 24. The server 40 may have a random access memory (RAM) 44 that may be used for loading programs, and storing program variable data.

In one embodiment, the room lock 30 may comprise an access reader 25, which may comprise a keypad or an employee card reader for example, and an access relay 27. A valid read event provided by the access reader 25 to the access relay 27 provides an activation event to the safe lock 26 to activate the safe lock 26. Valid codes or employee card access is provided by the user (10 in FIG. 1) using the access control software 202. If a valid read event is not provided by the access reader to the access relay 27, the access relay 27 does not provide an activation event to the safe lock 26. This prevents activation of the safe lock 26, even in the event of a break-in to the room 22.

In the case of a valid activation event, a lock actuator 34 of the safe lock may be activated upon receiving of a valid open code received from a logic decoder 36 of the lock 26. The logic decoder 36 will send a valid activation event only upon a valid encrypted code received from a safe lock keypad 38. The safe lock keypad 38 must receive a valid code typed in by the employee or worker who has already gained bona fide access to the room 22 so that the logic decoder 36 may then provide an activation event to the lock actuator 34, which will then only actuate the lock 26 to open the safe 24 upon receiving the valid activation events from both the logic decoder 36 and the access relay 27.

One or more of the components of the safe 26 and room access lock 30 may be powered by a battery 60 according to one embodiment.

Figure 3:
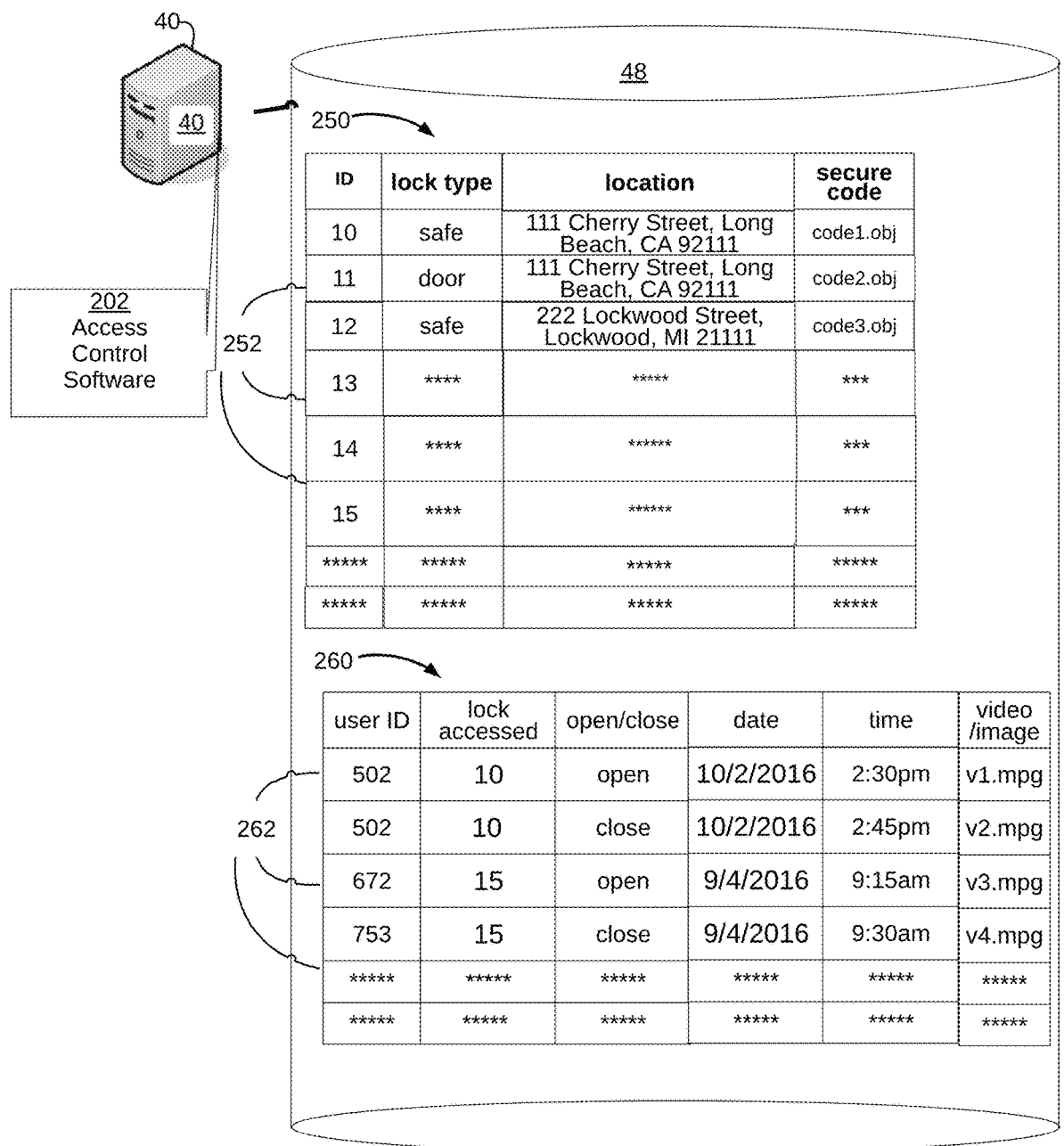
FIG. 3 is a more detailed diagrammatic representation of the storage device with a database containing electronic data that is transformed according to the embodiment of FIGS. 1-2.

With reference to FIG. 3, a more detailed diagrammatic representation of the storage device with a database containing electronic data that is transformed according to the embodiment of FIGS. 1-2 is shown. The access control software 202 may contain sets of instructions executing on the server 40 for transforming the data in the database 250 on storage device 48 for controlling access to the safe 24 as described above. In one embodiment, the database 250 may comprise one or more access control tables with records 252. and containing data for control of access. By way of example, and not by way of limitation, each record 252 may contain fields for storing data such as, a lock identifier for designating the identifier for a lock, whether it is a room lock 30 or a safe lock 26. The type of lock (room or safe) may be identified in another field of record 252. Further, the location of the lock for the record 252 may be stored in a location field. Finally, the security codes for each user may be stored in an encrypted field of the table 250.

Yet another table 260 may store relational records 262 containing audit data received from the room lock 30 and safe lock 26. Each time an entry or attempted entry is made to the room 22, or an opening or attempting opening is made for a safe 24, the relevant locks 26 or 30 may upload data to the server 40, to be received by the access control software 202, which may store such data in table 260. For example, each record may store the user identifier, the identifier for the lock accessed, whether it was an open or close event, the date, and the time. Further, each time a lock 26 or 30 is accessed or attempted to be accessed, the camera 32 may send video or pictures to the server 40, which is also stored in the record 262 by the access control software 202.

Figure 4:
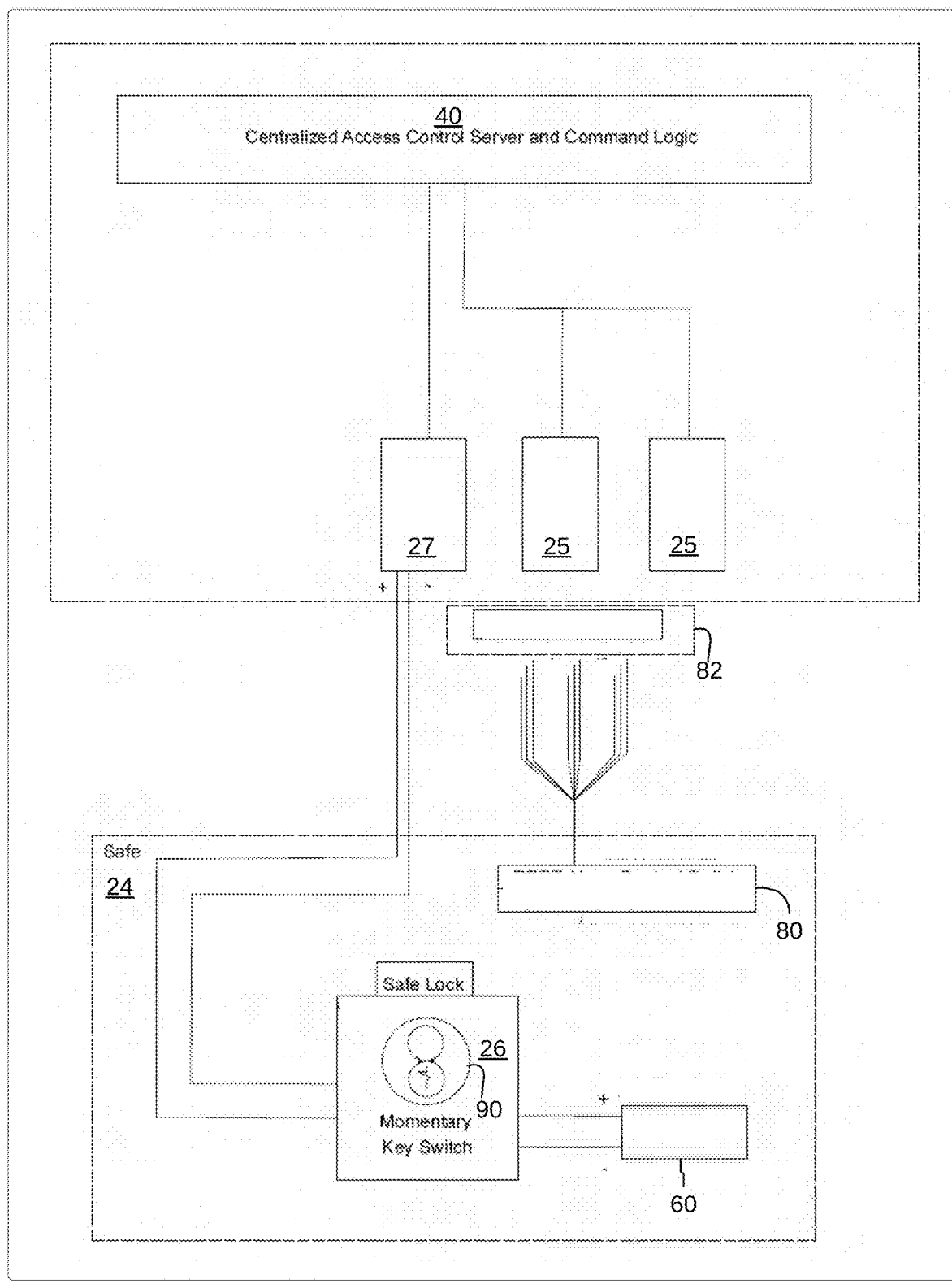
FIG. 4 is an alternative embodiment to FIG. 2 illustrating components and data flow of the system.

With reference to FIG. 4, an alternative embodiment to FIG. 2 is shown, illustrating components and data flow of the system. In one embodiment, dual access may be used, requiring two authorized users onsite to present their radio frequency identification proximity (RFID Prox) cards to one or two readers 25 simultaneously to gain access to the safe 24. The relay 27 power may be set for an interval of 1,500-2,000 milliseconds, but can be set to any interval. Furthermore, the safe may be inside a room 22 with a door that is also access controlled as shown in FIG. 1. In some embodiments, immediate changes can be made at remote locations that have the appropriate rights to add/change/delete authorized safe access users. An alarm contact 80 may report all safe door open and close times and dates to the server 40 through a monitored alarm system 82. Comparing the alarm input data of safe door openings to the Access Control system's authorized openings reveals any bypass openings. In one embodiment, a momentary key switch 90 may be used for unlocking the lock 26.

The above disclosed descriptions are only the most preferred embodiment of the present invention. However, it is not intended to be limiting to the most preferred embodiment of the present invention. Numerous variations and/or modifications are possible within the scope of the present invention.

I claim:

1. An access control system, comprising:
   one or more room locks capable of granting or denying access to a secured room, each room lock comprising an access reader capable of providing a first read event to a remote server connected over a network to all room locks in the access control system;
   wherein each room lock is capable of receiving an activation code based on a first verification of the first read event by the server; and
   one or more safe locks in each secured room further connected to the network to the remote server;
   wherein each safe lock is capable of sending a second read event to the server, and receiving an activation code based on a second verification of the second read event by the server;
   wherein the first and second verification are capable of being performed by the server by accessing and transforming data in an access control memory;
   wherein the access control memory contains records that each contain data in fields for storing a lock identifier, whether a lock is a room lock or a safe lock, a location of the lock the record identifies, and a security code for each one of one or more users in an encrypted field that have access to the lock.

2. The access control system of claim 1; wherein the room access lock is battery powered.

3. The access control system of claim 1, wherein the safe access lock is battery powered.

4. The access control system of claim 1, wherein the access control memory is further capable of storing audit data received from each room lock and safe lock to record each attempted access.

5. The access control system of claim 1, wherein the server requires dual access by means of radio frequency identifiers held by two or more users for verification of each room lock and safe lock.

6. An access control method, comprising:
   providing a first read event through a network to a server from an access reader of each of one or more room locks capable of granting or denying access to a secured room;
   sending an activation code to each room lock based on a first verification of the first read event by the server; and
   sending from one or more safe locks in each secured room further connected to the network, a second read event to the server, and receiving an activation code based on a second verification of the second read event by the server;
   wherein the first and second verification are capable of being performed by the server by accessing and transforming data in an access control memory;
   wherein the access control memory contains records that each contain data in fields for storing a lock identifier, whether a lock is a room lock or a safe lock, a location of the lock the record identifies, and a security code for each one of one or more users in an encrypted field that have access to the lock.

7. The method of claim 6; wherein the room access lock is battery powered.

8. The method of claim 6, wherein the safe access lock is battery powered.

9. The method of claim 6, wherein the access control memory is further capable of storing audit data received from each room lock and safe lock to record each attempted access.

10. The method of claim 6, wherein the server requires dual access by means of radio frequency identifiers held by two or more users for verification of each room lock and safe lock.

* * * * *